United States Patent [19]

Grey

[11] Patent Number: 4,876,844

[45] Date of Patent: Oct. 31, 1989

[54] FIELD CROP HARVESTING, CARTON PACKAGING AND PACKED CARTON HANDLING MACHINE AND METHOD

[75] Inventor: Donald M. Grey, Selma, Calif.

[73] Assignee: Grey Technologies, Inc., Selma, Calif.

[21] Appl. No.: 354,896

[22] Filed: May 19, 1989

[51] Int. Cl.⁴ .............................................. B65B 67/02
[52] U.S. Cl. ....................................... 53/458; 53/391;
53/564; 56/DIG. 10
[58] Field of Search .................. 53/458, 457, 391, 390,
53/564, 250, 249; 414/345, 343, 919; 56/327.1,
328.1, 209, DIG. 10

[56] References Cited

U.S. PATENT DOCUMENTS

| | | |
|---|---|---|
| 1,504,846 | 8/1924 | Tarkington . |
| 2,337,615 | 12/1943 | McLaren ................. 130/23 |
| 2,473,587 | 6/1949 | Huston . |
| 2,590,965 | 4/1952 | Huston . |
| 2,647,525 | 8/1953 | Duda et al. ................. 134/63 |
| 2,699,277 | 1/1955 | Martin ....................... 226/2 |
| 2,699,877 | 1/1955 | Huston . |
| 2,804,739 | 9/1957 | Martin ....................... 53/391 |
| 3,380,234 | 4/1968 | Garrett . |
| 3,380,237 | 4/1968 | Garrett ...................... 56/327 |
| 3,497,013 | 2/1970 | Baker ........................ 171/38 |
| 3,599,395 | 8/1971 | Rodriquez ................. 53/391 |
| 3,724,168 | 4/1973 | Cassady, Jr. et al. ....... 53/391 X |
| 4,292,784 | 10/1981 | Abatti et al. .............. 53/391 |
| 4,590,739 | 5/1986 | Abatti et al. .............. 53/391 |
| 4,616,468 | 10/1986 | Munoz ....................... 53/391 |

Primary Examiner—James F. Coan
Attorney, Agent, or Firm—Shlesinger & Myers

[57] ABSTRACT

A field crop harvesting, carton packaging and packed carton handling machine, which includes transport means having a front section, central section and a trailing section; the front and trailing sections include ground engaging means and each include a platform mounted on the ground engaging means; the front platform also includes area means for stacking and supplying non-erected cartons and for erecting the non-erected cartons; the central section includes conveyor support means including a central conveyor means and a left and right conveyor means; the left and right conveyor means each include erected carton receiving and supplying means; the left and right conveyor means also include a series of carton packing stations as well as a conveyor for moving the packed cartons to the central conveyor; the central conveyor includes a rearwardly moving conveyor for transporting the packed cartons rearwardly to the trailing platform; and the trailing platform includes area means for receiving, handling and sealing the packed cartons and distributing the sealed cartons. The invention also includes the method of harvesting, carton packaging and packed carton handling together with the steps of cleaning the crop and sealing the same in the cartons.

28 Claims, 5 Drawing Sheets

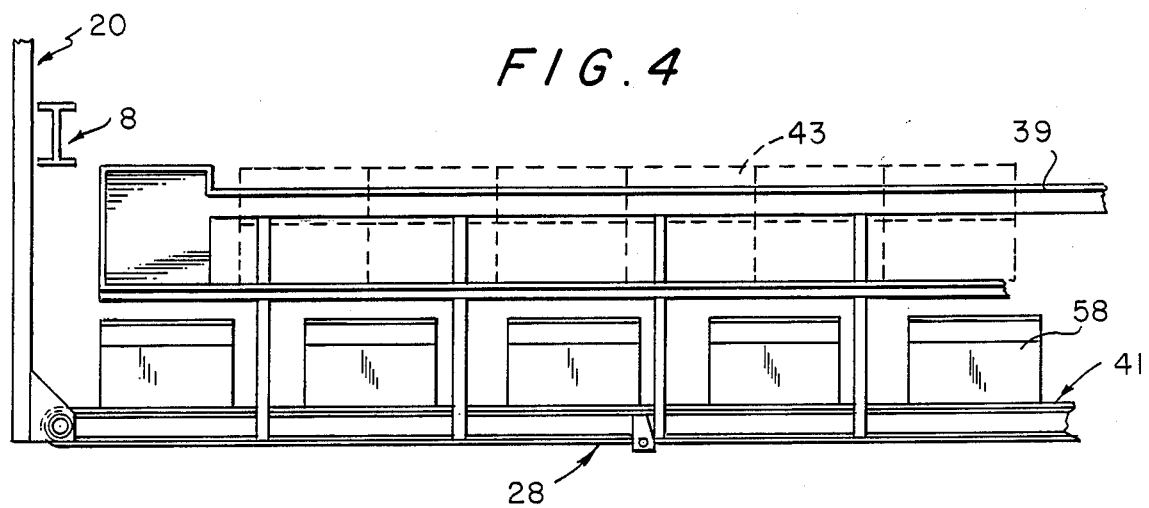
FIG. 4
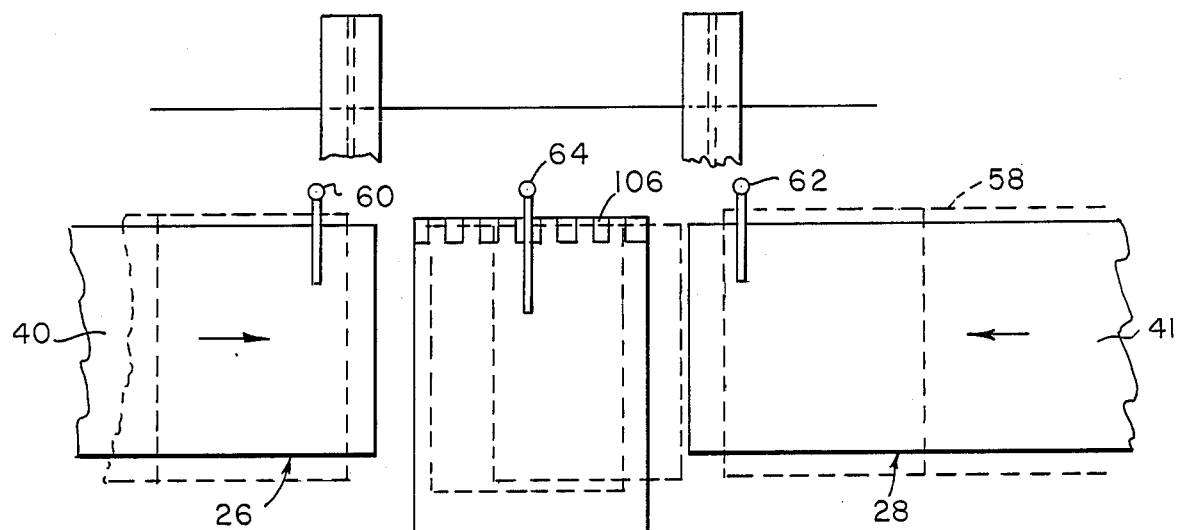
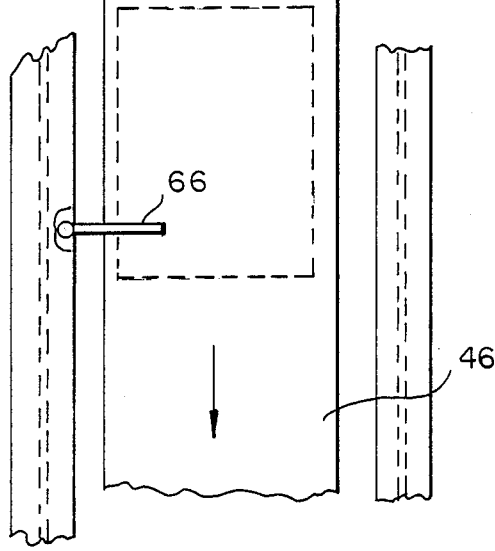
FIG. 5

FIELD CROP HARVESTING, CARTON PACKAGING AND PACKED CARTON HANDLING MACHINE AND METHOD

This invention relates to crop harvesting, carton packaging and packed carton handling machines for use in the harvesting of crops such as lettuce, cabbages, tomatoes, and the like, wherein all of the basic labor involved in the erecting of the cartons and the moving of the cartons to the laborers in the field and the conveying of the cartons packaged by the laborers and the moving of the cartons to laborers who will be cleaning the crop and sealing the cartons is done on a single unit. It also includes the method and steps involved in the procedure of taking a folded carton, erecting the same, filling the same and conveying the filled carton for purposes of cleaning the produce in the carton and sealing the carton prior to loading the carton for transporting away from the machine.

HISTORICAL BACKGROUND

In the development of machines for handling crops such as lettuce, cabbages and the like, the standard procedure was to take non-erected cartons and deliver them to the fields by a transport with a worker disposing the non-erected cartons along the rows at intervals. The field hand would reach for a carton and erect the same, and cut the head of the lettuce or the like from the plant and position the head in the carton until the carton was filled. The butt of the head always was positioned upward in the carton. The butt was subsequently washed by a person carrying a bucket of water and going from carton to carton with a brush or hand operated sprayer which would wash the butt of the head to prevent browning of the butt. The consumer does not like to have lettuce which shows brown spots even on the butt. The washing removes the sap sufficiently to prevent browning.

Subsequent to the packing of the cartons in the field, a second transport would arrive with workers who pick up the cartons and place them on the transport. In some instances the carton would be sealed by other workers prior to being put on the transport or they would be sealed subsequent to their having been placed on the transport.

More recently, machines have been devised to feed cartons or crates (Huston U.S. Pat. Nos. 2,590,965 and 2,699,877) along rows on wings extending outwardly from a transport so that the field hands could remove the crates, load the crates and put them back on conveyors which were disposed on the wings for moving the crates inwardly of the wings towards the central area for removal thereof and subsequent washing and sealing. Martin, U.S. Pat. Nos. 2,699,277 and 2,804,739 are typical harvesting units for lettuce and similar crops which provide conveyors on wings or the like.

Other type harvesters for similar head crops are Baker, U.S. Pat. No. 3,497,013; Abatti, U.S. Pat. No. 4,292,784; Munoz, U.S. Pat. No. 4,616,468; McLaren, U.S. Pat. No. 2,337,615; Rodriguez, U.S. Pat. No. 3,599,395; Tarkinton, U.S. Pat. No. 1,504,846; Huston, U.S. Pat. No. 2,473,587; and Garrett, U.S. Pat. No. 3,380,234.

OBJECTS AND SUMMARY

It is an object of this invention to provide a field harvester for lettuce and like crops which reduces substantially the number of field hands required to harvest a crop utilizing present equipment.

It is a further object of this invention to provide field crop harvesting machine which will carry at least a days supply of empty cartons and wash water thus avoiding the need for supporting field trucks as with prior equipment.

Yet another object of this invention is to provide a field harvester transport which may be towed or which may have its own power drive mechanism which will operate in regular furrows and will travel between 6 and 15 feet per minute or faster or slower as required depending upon the crop.

Yet another object of this invention is to provide a field harvesting machine which includes means for raising and lowering the wings depending upon the terrain so that the wings are also at a proper height above the crop in order to provide maximum comfort to the field hands picking up the empty cartons and loading the full cartons onto the conveyor system.

Still another object of this invention is to provide an automatic conveyor system which will automatically shut down one conveyor while another conveyor is handling a carton so that there is no jam on the central conveyor which is continuously moving the filled cartons away from the wings.

Yet another object of this invention is to provide a central conveying system positioned between the front and rear ground engaging wheels in order to permit the packer to work closer to the end of the field prior to the machine making its turn. This eliminates the necessity for the packer to have to work farther away from the loading mechanism in certain areas of the field prior to loading the filled cartons onto the machine.

A further object of this invention is to provide a raised center frame which permits all the packing to be done on the wings and which provides a center tower frame which will tilt relative to the main support frame so that the center tower frame controls the wings which can be made to follow the contour of the ground which may differ from that of the support frame itself.

A further object of this invention is to provide means for field hands who are handling the non-erected cartons to work in a front area before the picker and thus avoid interference with the pickers since they are standing on a moving platform and do not have to avoid interference with the pickers.

Yet another object of this invention is to eliminate the need for removing pallets of empty cartons to provide room to fold wings up on the machine for transport to the field since all of the cartons are out of the way of the wings when they must be folded, being on a forward platform from the central section on which the wings are supported.

Another object of this invention is to provide a harvesting machine which will produce a better quality of packed "naked" lettuce or the like. The invention includes means for supporting a carton on the machine during the packing step therefore avoiding dirt and other contaminates from getting into the packaging operation.

Still another object of this invention is to provide a platform in which the washing of the butts of the head can be done on a continuous basis and which includes a supply of water for the washing which will permit the continuous operation of the unit throughout the day without requiring subsequent transport for water or the like to be brought to the field hands.

Still another object of this invention is to provide a machine which provides better stability with wheels both fore and aft of the wings.

In summary, this invention provides a field crop harvesting, carton packaging and packed carton handling machine which is designed to carry a number of field hands during the entire operation where with the prior developments would be walking along side the harvesting unit or be on separate transports going back and forth to the field unit. The invention provides convenience, durability, stability, and economy by reducing the number of field workers presently required. In the accompanying drawings which illustrate by way of example various embodiments of this invention, FIG. 1 is a side elevational view of the invention showing in part a tractor mechanism and illustrating in phantom lines cartons positioned on the machine.

FIG. 4 is a fragmentary elevational view from the rear of one side of the machine showing the erected cartons positioned on the rack with the filled cartons on the conveyor system beneath the rack;

FIG. 5 is a diagrammatic view of the conveyor systems showing cartons on the conveyors with the movement of the conveyors shown by the arrows;

FIGS. 1 THROUGH 4

Figure 1:
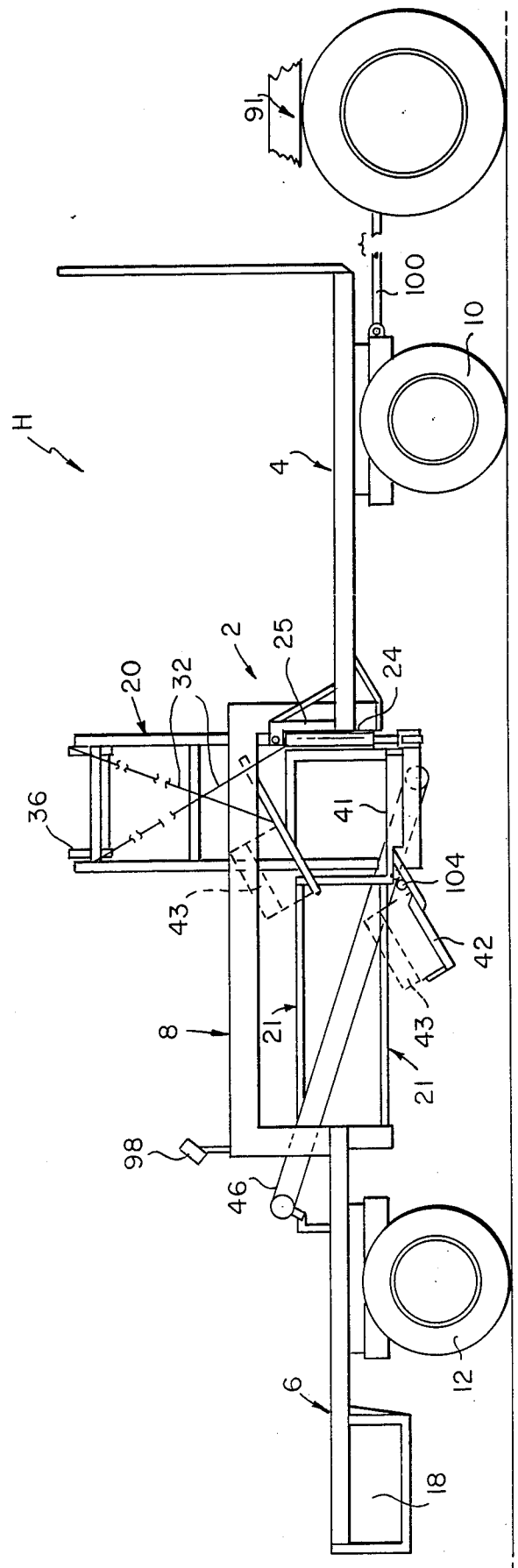
Figure 2:
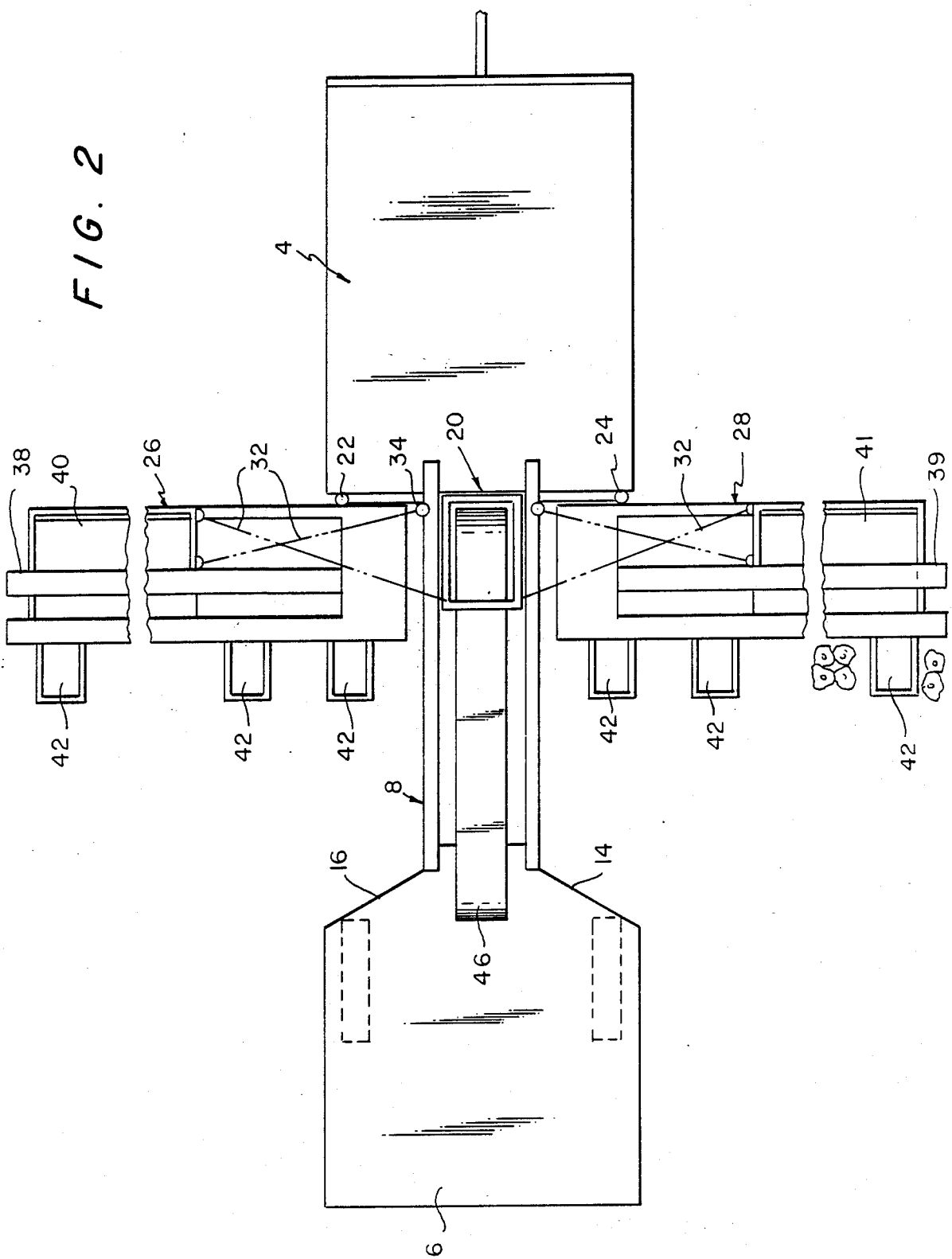
FIG. 2 is a top plan view of the invention.

The harvester H incorporates a main frame 2. The main frame 2 includes a front platform 4 and a rear platform 6. The main frame 2 includes a central support frame 8. As will be noted in FIG. 1, the central support frame 8 is considerably narrower than the front platform 4 and the rear platform 6.

Ground engaging wheels 10 are mounted beneath the front platform 4 and ground engaging wheels 12 are mounted beneath the rear platform 6.

The main frame 2 is rigid and designed to support heavy loads centrally thereof over the ground engaging wheels 10 and 12.

The front platform 4 is of substantial dimension permitting the stacking of a day's supply of non-erected cartons as well as providing room for field hands to work in the erecting and feeding of the cartons to the field hands in the field by means subsequently described.

The rear platform 6 is of substantial size and area and includes canted front edges 14 and 16 which are designed to nudge a worker to one side should he be careless and permit the machine to move toward him in the field.

A tank 18 for supplying water to field workers standing on the rear platform 6 who will be spraying the butts of the harvested heads which are in the packages prior to their being sealed by other farm hands standing on the platform. Additional farm hands will handle the sealed cartons for delivery to a transport. A conveyor mechanism may be provided (not shown) for removing the sealed cartons from the rear platform 6.

Figure 3:
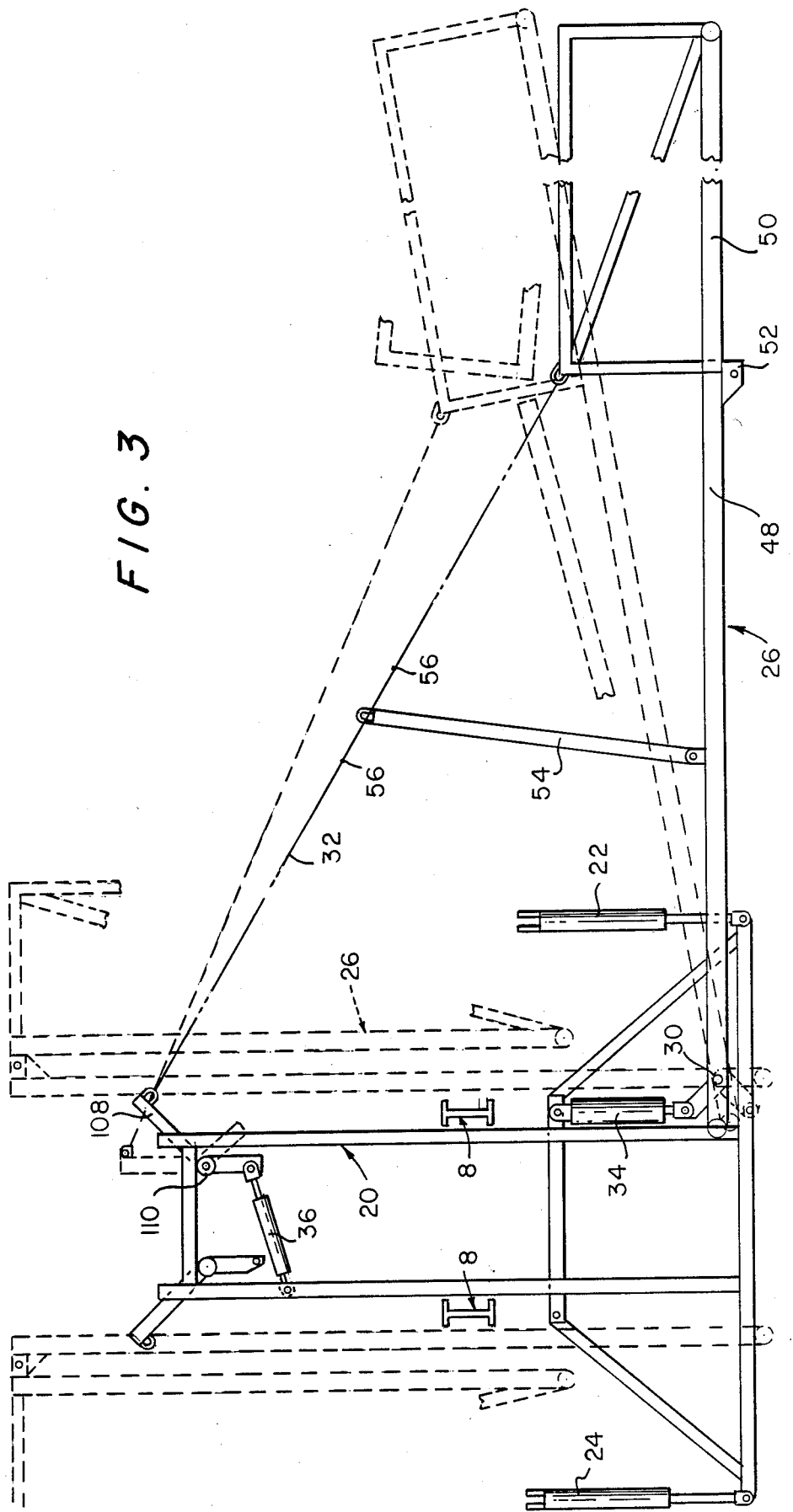
FIG. 3 is a fragmentary front elevational view of the wing and central tower disconnected from the main frame and further showing in phantom lines a wing being partially moved to the elevated position and in the final elevated position.

A tower assembly 20 is operably associated with the central support frame 8 by means of a four-bar linkage 21 and piston-cylinder assemblies 22 and 24, as best shown in FIGS. 1 and 3. A support bracket 25 secures the piston-cylinder assembly 24 to the central support frame 8. A similar bracket (not shown) secures the piston-cylinder assembly 22 to the central support frame 8. Wings 26 and 28 are each disposed on opposite sides of the tower assembly 20. Wing 26 is supported from the tower assembly 20 by pivot 30 and cables 32, as best shown in FIG. 3. The wing 28 is similarly supported by piston-cylinder assemblies (not shown) from the tower assembly 20. Piston-cylinder assemblies 34 and 36, which are pivotally secured to the tower assembly 20, are used to lift the wing 26 from a horizontal to vertical storage position, as shown in phantom lines in FIG. 3. The piston-cylinder assemblies 34 and 36 are also used to adjust the horizontal orientation of the wing 26, as shown in phantom lines in FIG. 3, to adjust for the varying contour of the field. Another set (not shown) of the piston-cylinder assemblies 34 and 36 are used to similarly operate the wing 28.

The wing 26 includes an empty carton rack 38 disposed along its length. Similarly, the wing 28 also includes an empty carton rack 39 disposed along its length. The wing 26 includes a conveyor 40 disposed below the empty carton rack 38 and is driven towards the central support frame 8. The wing 28 also includes a conveyor 41 disposed below the empty carton rack 39 and is driven towards the central support frame 8. The empty carton racks 38 and 39 are used for lining up erected empty cartons 43 shown in phantom lines in FIG. 4.

Each of the wings 26 and 28 includes a plurality of removable pack frames 42 which are supported along the length of each of the wings 26 and 28 by conventional means (not shown). Each of the pack frames 42 is designed to hold an erected empty carton 43 at a height above the field. The height of each of the pack frames 42 may be adjusted by operating the piston-cylinder assemblies 22 and 24. As best shown in FIG. 3, by extending the piston-cylinder assemblies 22 and 24, the height of the wing 26 above the field is reduced, thereby also reducing the height of each of the pack frames 42 disposed along the length of the wing 26.

Central frame 8 includes a central conveyor 46 which is designed to carry the pack cartons towards the rear platform 6 from each of the conveyors 40 and 41.

Each of the wings 26 and 28 is foldable. As will be described for the wing 26 which is equally applicable to the wing 28, the wing 26 includes foldable sections 48 and 50 which are pivotable about pivot 52. The foldable sections 48 and 50 help to make the wing 26 relatively compact when disposed in the vertical position, as best shown in phantom lines in FIG. 3.

Piston-cylinder assemblies disposed in the central support frame 8 are used to position the wings 26 and 28 between the horizontal operative position and the vertical storage position. As will be described for the wing 26, but equally applicable to the wing 28, a piston-cylinder assembly 34 and a piston-cylinder assembly 36 disposed in the central support frame 8 cooperatively operate to deploy the wing 26 from its vertical storage position to its horizontal operative position. A similar set of piston-cylinder assemblies (not shown), also disposed in the central support frame 8 are operably associated with the wing 28 to similar operate the wing 28 from its vertical storage position to its horizontal operative position.

A pole 54 which floats between two cable clips 56 helps in the deployment of the wing 26. A similar arrangement (not shown) is operably associated with the wing 28 for the same purpose.

FIGS. 5 THROUGH 6

A switch 60 is operably associated with the conveyor 40 and disposed such that a packed carton 58 travelling along the conveyor 40 will contact and operate the switch 60. A switch 62 is operably associated with the conveyor 41 and positioned in such a way that a packed carton 58 travelling along the conveyor 41 will contact and operate switch 62. A switch 64 is disposed adjacent the central conveyor 46 in such a way that the packed carton 58 entering the central conveyor 46 will contact and operate the switch 64. A switch 66 is disposed adjacent an intermediate portion of the central conveyor 46 in such a way that the packed carton 58 moving along in the direction of the arrow on the central conveyor 46 will contact and operate the switch 66. The interrelationship of the switches 60, 62, 64 and 66 will be described below.

Figure 6:
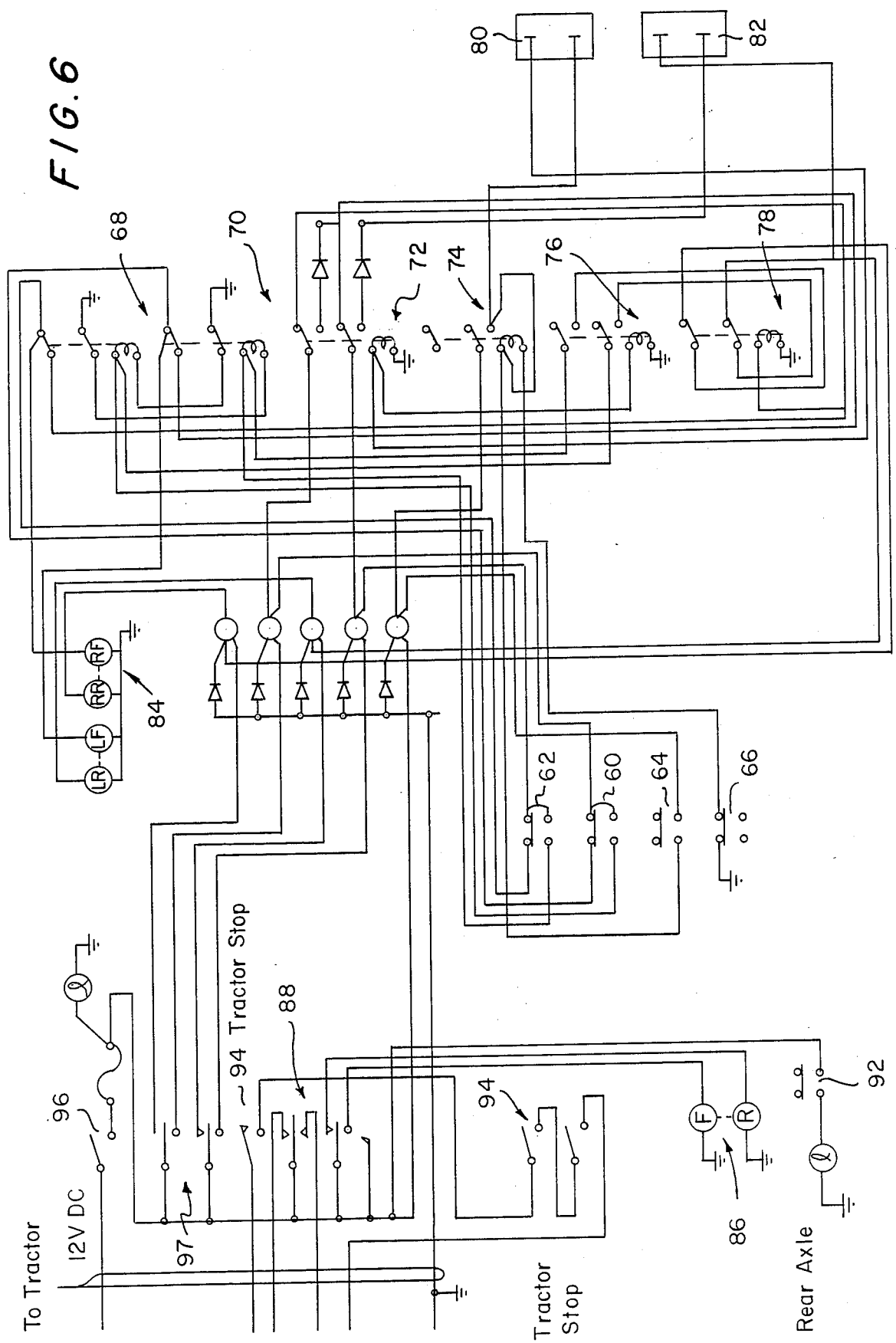
FIG. 6 is the circuit control panel diagram of the electrical system for maintaining and operating the conveyors.

A control circuit is disclosed in FIG. 6 for controlling the operation of the conveyors 40, 41 and 46. The electrical switches 60, 62, 64 and 66 are interconnected with relays 68, 70, 72, 74, 76 and 78. Time delay relays 80 and 82 are operably associated with the switches 60, 62, and 64. Drive valves 84 control the drive means (not shown) for the conveyors 40 and 41. Drive valve 86 controls the drive means (not shown) for the central conveyor 46. Switch 88 is operably associated with the drive valve 86. Switch 90 is operably associated with the drive means (not shown) of a tractor 91 which is used to pull harvester H through the field. A switch 92 operates a lamp disposed at the rear axle of the harvester H. A plurality of switches 94 are provided for stopping the tractor 91. Switch 96 provides the main on/off control for the entire circuit. Switches 97 provides on/off control for the conveyors 40 and 41. A remote panel 98 disposed adjacent the rear platform 6 provides a centralized location for the switches 88, 90, 92, 94, 96 and 97.

OPERATION

The operation of the harvester H will now be described. When the harvester H arrives at a field to be harvested, the tractor 91 is attached to the harvester H by means of pull tongue 100. It should be understood by a person skilled in the art that the harvester H may be self-propelled. The hydraulics and the electrical power of the tractor 91 are connected to the harvester H through hose (not shown) and cables (not shown).

The wings 26 and 28 are then deployed from their vertical storage positions to their horizontal operative positions. The following discussion will describe the operation of the wing 26, but the same description will apply to the operation of the wing 28. The wing 26 is deployed to its horizontal operative position by retracting piston-cylinder assemblies 34 and 36. The pole 54 restrains the cables 32 when it contacts the cable clips 56, thereby pulling up the foldable section 50 into a horizontal position. In the horizontal position, the wing 26 is supported by the cables 32 and pivot 30. The cables 32 are crossed to provide additional stability the wing 26 when in the horizontal position. The empty carton rack 38 is then swung into place and the pack frames 42 are hooked onto the wing 26 by conventional means (not shown). The number of the pack frames 42 may be increased or decreased as required by the number of packers involved in the harvesting of the crop.

The harvester H and the tractor 91 are then positioned into the proper row. After the harvester H and tractor 91 are properly aligned in the row, the tractor 91 is left to move through the row without a driver. The remote panel 98 provides the necessary controls for speeding up, slowing down or stopping the tractor 91.

The harvester H is brought to the field with a day's supply of non-erected empty cartons on the front platform 4 and with the tank 18 filled with water.

The harvester H is now ready for field operation.

The cutting of the crop is done ahead of the harvester H as it now done by hand crew. A carton erecting person stationed on the front platform 4 begins erecting the non-erected cartons and distributing them along the length of the empty carton racks 38 and 39 on a side by side manner, as best shown in FIG. 4. A packer in the field then pulls one of the empty cartons 43 from either of the empty carton racks 38 and 39 and places it in one of the pack frames 42.

The packer then places the harvested crops into empty carton 43 in the pack frame 42. The harvester H carries the carton along at a proper ground speed as the packer fills the carton with the harvested crops. The height of the pack frames 42 can be raised or lowered to the most convenient height for the packer by either extending or retracting the piston-cylinder assemblies 22 and 24, as best shown in FIG. 3. Since the tower assembly 20 supports the wings 26 and 28 by means of the piston-cylinder assemblies 22 and 24 and the four-bar linkage 21, the actuation of the piston-cylinder assemblies 22 and 24 will raise or lower the wings 26 and 28.

When the carton is packed, the packer pushes the packed carton 58 forward with the aid of rollers 104 at the forward end of the back frame 42 until the pack carton is placed on the conveyor belt 40 or 41.

The packed cartons on the conveyors 40 and 41 are conveyed toward the central conveyor 46 from each of the wings 26 and 28, as best shown in FIG. 5. When two abutting packed cartons arrive at the central conveyor 46 at the same time or one from each of the conveyors 40 and 41 at the same time, the switches 60, 62 and 64 and the associated circuitry regulate the loading of the packed cartons onto the central conveyor 46. The switches 60, 62, 64 and 66, which control the operation of the conveyors 40 and 41 associated with each of the wings 26 and 28 and the central conveyor 46, provide for a comfortable spacing of the packed cartons as they arrive at the rear platform 6. As the packed cartons 58 move toward the central conveyor 46 from the wings 26 and 28, the first packed carton to contact either of the switches 60 and 62 gets the priority in entering the central conveyor 46. Assuming that the packed carton 58 from the conveyor 41 contacts switch 62 before the packed carton 58 on conveyor 40 contact switch 60, then switch 62 shuts down the conveyor 40 to allow along one packed carton 58 to enter the central conveyor 46. The packed carton 58 from conveyor 41 then moves onto the central conveyor 46, aided by rollers 106 which are free to rotate in two directions. As the packed carton 58 enters the central conveyor 46, as shown in phantom lines in FIG. 5, the pack carton 58 contacts the switch 64. The switch 64, after a time delay, will shut down the conveyor 41. A time delay relay activated by the switch 64 allows the conveyor 41 to continue to operate and push the packed carton 58 completely onto the central conveyor 46 before the conveyor 41 shuts down. The central conveyor 46 runs continuously and conveys the packed carton 58 towards the rear platform 6. As the packed carton 58 travels along the central conveyor 46, as generally indicated by the phantom lines in FIG. 5, the packed carton 58 contacts the switch 66. The switch 66 reactivates either of the conveyors 40 and 41, depending on which of the packed cartons first contacts the switches 60 and 62. The first packed carton to contact either of the switches 60 and 62 will be allowed to proceed to the central conveyor 46.

If two packed cartons are abutting each other as they proceed toward the central conveyor 46, the leading packed carton will contact the switch 64. Assuming that the abutting packed cartons came from conveyor 41, the conveyor 41 will reverse itself after the time delay, typically two seconds, has run out, until the switch 62 has cleared the trailing packed carton. This gives clearance for the leading packed carton to enter the central conveyor 46 without obstruction from the trailing and abutting packed carton.

A person stationed on the rear platform 6 takes the packed cartons from the central conveyor 46. The person then washes the crops and closes the cartons. A water pump (not shown) and a hose and nozzle assembly (not shown) associated with the tank 18 provides the person with water to wash the crop butts. The carton is then closed and stapled. At this point, the carton can be carried onto a conveyor (not shown) to a transporter (not shown) which may be trailing the harvester H, or the carton may be delivered back to the field along a row for later pick up by another machine.

When the harvester H has completed a pass through the field, a person mounts the tractor 91 to turn it around. At this point, the wings 26 and 28 can be raised to clear any obstructions such as ditch banks, etc., by selectively or cooperatively actuating piston-cylinder assemblies 22, 34 and 36 associated with the wing 26 and the piston-cylinder assembly 24 and the other piston-cylinder assemblies (not shown) associated with the wing 28. Raising the wing 26 or 28 can be done without removal of any of the pack frames 42 or the cartons that the packers may be using to harvest with.

To fold the machine for road travel, the piston-cylinder assemblies 34 and 36 are actuated to position the wing 26 into the folded vertical position. The piston-cylinder assembly 36 causes a bracket 108 to pivot about pivot 110 away from the wing 26, thereby causing the wing 26 to pivot about pivot 30 into an inclined position shown in phantom lines in FIG. 3. The pole 54 causes the cables 32 to be taut as it engages the cable clips 56, thereby causing the foldable section 50 to rotate about pivot 52. The piston-cylinder assembly 34 extends to take the load off the cables 56 and permits the section 50 of the wing 26 to continue to rotate about pivot 52. As the piston-cylinder assembly 34 continues to extend, the wing 26 continues to rotate about pivot 30 while the section 50 continues to also rotate about pivot 52 until the wing 26 is in the vertical folded position, as best shown in phantom lines in FIG. 3. The same operation is used for the wing 28 by actuating piston-cylinder assemblies associated therewith but not shown.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

What I claim is:

1. A field crop harvesting, carton packaging and packed carton handling machine, comprising:
    (a) transport means including a front section, a central section and a trailing section;
    (b) said front and trailing sections having ground engaging means and each having a platform mounted on said ground engaging means;
    (c) said front platform including area means for stacking and supplying non-erected cartons and for erecting said non-erected cartons;
    (d) said central section including conveyor support means including a central conveyor means and left and right conveyor means;
    (e) said left and right conveyor means each including erected carton receiving and supplying means;
    (f) said left and right conveyor means each including a series of carton packing stations;
    (g) said left and right conveyor means each including a conveyor for moving packed cartons to said central conveyor means;
    (h) said central conveyor means including a rearwardly moving conveyor for transporting said packed cartons rearwardly to said trailing platform; and
    (i) said trailing platform including area means for receiving, handling and sealing said packed cartons and distributing said sealed cartons.

2. A machine as in Claim 1 and including:
    (a) means for preventing jamming of said central conveyor by the packed cartons on said left and right conveyors.

3. A machine as in Claim 2, wherein:
    (a) said jamming preventing means includes an electrical circuit for automatically selectively activating said left and right conveyors.

4. A machine as in Claim 3, wherein:
    (a) said electrical circuit includes carton contact sensor means and time delay means.

5. A machine as in Claim 3, wherein:
    (a) said rearwardly moving conveyor includes means for maintaining said rearwardly moving conveyor in continuous operation during selective operation of said left and right conveyors.

6. A machine as in Claim 1, wherein:
    (a) each of said erected carton receiving and supplying means is positioned above each respective conveyor for moving packed cartons to said central conveyor means.

7. A machine as in Claim 1, wherein:
    (a) each of said erected carton receiving and supplying means includes an inclined rack means.

8. A machine as in Claim 1, wherein:
    (a) each of said left and right conveyor means includes foldable wings.

9. A machine as in Claim 8, wherein:
    (a) said foldable wings are vertically foldable for storage and horizontally extended for harvesting.

10. A machine as in Claim 1, wherein:
    (a) said central section includes a support tower means for elevating said left and right conveyor means during harvesting.

11. A machine as in Claim 10, wherein:

(a) said central section includes piston cylinder means for elevating and lowering said support tower means.

12. A machine as in Claim 11, wherein:
(a) said central section includes means for tilting said tower means relative to said platforms.

13. A machine as in Claim 12, wherein:
(a) said tilting means includes pivot means for said piston-cylinder means.

14. A machine as in Claim 9, wherein:
(a) said tower means includes cable means for supporting said left and right conveyor means when horizontally extended and vertically folded.

15. A machine as in Claim 10, wherein:
(a) said cable means are crossed for maximum strength.

16. A machine as in Claim 9, wherein:
(a) said foldable wings include piston-cylinder means for folding and extending said wings.

17. A machine as in Claim 1, wherein:
(a) said front section, central section and trailing section include a single integral frame means.

18. A machine as in Claim 17, wherein:
(a) said single integral frame means includes central, front and trailing frames and said central frame extends above said front and trailing frames.

19. A machine as in Claim 16, wherein:
(a) said foldable wings are independently operable.

20. A machine as in Claim 16, wherein:
(a) each wing includes a pole for aiding in extending said wings when lowered to the horizontal.

21. A machine as in Claim 9, wherein:
(a) said cable means includes clips; and
(b) each wings includes a pole for cooperating with said clips for aiding in extending said wings when lowered to the horizontal.

22. A machine as in Claim 3, wherein:
(a) said electrical circuit includes means for reversing said left and right conveyors.

23. A machine as in Claim 1, wherein:
(a) said trailing platform includes safety means for notifying a field worker that the machine is advancing.

24. A machine as in Claim 23, wherein:
(a) said safety means includes angled front edges on said trailing platform extending rearwardly and outwardly on both sides of said platform.

25. A machine as in Claim 1, wherein:
(a) said central section is narrower than said front and trailing sections.

26. In a fielded harvesting transport for supplying cartons to field hands, picking up packed cartons, handling and delivering the packed cartons, said field harvesting transport including ground engaging means and a platform supported by said ground engaging means, the invention comprising:
(a) a wing support tower;
(b) a wing supported by said tower and extending outwardly therefrom;
(c) said tower including means for vertically raising and lowering said tower and said wing relative to said platform;
(d) said tower including means for tilting said tower and wing relative to said platform;
(e) whereby said wing is maintained at a proper distance above said crop regardless of ground contour.

27. The invention as in Claim 26, wherein:
(a) said tower includes means for elevating said wing relative to said tower.

28. A method of packing and transporting head crops and the like, including the steps of:
(a) providing a transport having non-erected cartons thereon;
(b) erecting said cartons on said transport and delivering said erected cartons to pre-selected stations on both sides of said transport for access to field workers positioned on both sides of said transport for packing said crops in said cartons on said transport by said field workers;
(c) conveying by conveyors on both sides of said transport said packed cartons to a central conveyor on said transport;
(d) automatically controlling said cartons on said side conveyors as they are conveyed from both side of said transport to a central conveyor on said transport by selectively stopping one of said side conveyors to permit the other conveyor to position only one carton at a time on said central conveyor while maintaining said central conveyor at all times in operation;
(e) automatically starting up said stopped side conveyor to alternately feed packed cartons to said central conveyor;
(f) sealing said cartons on said transport; and
(g) delivering said sealed cartons to storage means.

* * * * *